United States Patent [19]
McKenzie et al.

[11] Patent Number: 5,958,615
[45] Date of Patent: Sep. 28, 1999

[54] METAL-AIR CATHODE CAN, AND ELECTROCHEMICAL CELL MADE THEREWITH

[75] Inventors: Rodney Stuart McKenzie; Robert B. Dopp, both of Madison, Wis.

[73] Assignee: Rayovac Corporation, Madison, Wis.

[21] Appl. No.: 09/012,096

[22] Filed: Jan. 22, 1998

Related U.S. Application Data

[63] Continuation of application No. 08/530,754, Sep. 19, 1995, Pat. No. 5,795,667, which is a continuation-in-part of application No. 08/435,477, May 5, 1995, Pat. No. 5,733,676.

[51] Int. Cl.$^6$ ................................................. H01M 2/12
[52] U.S. Cl. .............................................. 429/27; 429/82
[58] Field of Search .................... 429/27, 82, 87

[56] References Cited

U.S. PATENT DOCUMENTS

| | | |
|---|---|---|
| 2,797,254 | 6/1957 | Schumacher et al. |
| 4,041,211 | 8/1977 | Wiacek ................... 429/27 X |
| 4,118,544 | 10/1978 | Prybyla et al. ............ 429/27 |
| 4,262,062 | 4/1981 | Zatsky ..................... 429/27 |
| 4,439,500 | 3/1984 | Gibbard et al. ............ 429/27 |
| 4,640,874 | 2/1987 | Kelm ....................... 429/27 |
| 4,649,090 | 3/1987 | Oltman et al. ............. 429/29 |
| 4,687,714 | 8/1987 | Oltman et al. ............. 429/27 |
| 5,069,986 | 12/1991 | Dworkin et al. ........... 4429/27 |
| 5,191,274 | 3/1993 | Lloyd et al. ............. 429/27 X |
| 5,279,905 | 1/1994 | Mansfield et al. ......... 429/27 |
| 5,306,578 | 4/1994 | Ohashi et al. ............ 429/27 |

FOREIGN PATENT DOCUMENTS

| | | | |
|---|---|---|---|
| 0741429 A2 | 11/1996 | European Pat. Off. | H01M 12/06 |
| 2673488 | 2/1992 | France | H01M 4/70 |
| 62-202470 | 2/1987 | Japan | H01M 12/06 |
| 4-206443 | 7/1992 | Japan | H01M 2/02 |
| 5-47422 | 2/1993 | Japan | H01M 12/06 |
| 5-217605 | 8/1993 | Japan | H01M 12/06 |
| 1394218 | 5/1975 | United Kingdom | H01M 12/06 |
| WO 94/01898 | 1/1994 | WIPO | H01M 12/06 |

*Primary Examiner*—Stephen Kalafut
*Attorney, Agent, or Firm*—Brian R. Tumm; Thomas D. Wilhelm; Michael L. Winkelman

[57] ABSTRACT

This invention pertains to metal-air electrochemical cells wherein one or more air entry ports is located in the bottom of the cathode can, to provide for entry of oxygen-rich air into the cathode can, where the oxygen participates in the chemical reaction whereby the cell produces electrical energy. In this invention, multiple small air entry ports are provided. Generally, the use of multiple ports distributed over the bottom of the cathode can, opposite the reaction surface of the cathode assembly, while not increasing the overall open area of the ports, results in an increase in the ratio of the cell limiting current to the rate at which moisture is lost from the cell. Accordingly, moisture loss as a function of electrical energy produced, is reduced. Preferred embodiments of the air entry ports have a stepped cross-sectional opening that provides a larger diffusion area controlling diffusion of air into and out of the cell through a covering tab prior to the cell being put into use, and a smaller untabbed diffusion area controlling diffusion of air into and out of the cell when the cell is in use.

8 Claims, 9 Drawing Sheets

METAL-AIR CATHODE CAN, AND ELECTROCHEMICAL CELL MADE THEREWITH

This is a continuation application of Ser. No. 08/530,754, filed Sep. 19, 1995, now U.S. Pat. No. 5,795,667, issued Aug. 18, 1998, which was a Continuation-in-Part of application Ser. No. 08/435,477, filed May 5, 1995, now U.S. Pat. No. 5,733,676 herein incorporated by reference in its entirety.

FIELD OF THE INVENTION

This invention relates to alkaline electrochemical cells having metallic anodes and air cathodes, commonly known as metal-air cells. More particularly, this invention relates to the structure of the cathode cans, and to the use of small ports on the bottoms of the cathode cans.

BACKGROUND OF THE INVENTION

The growth in use of small electrically-powered devices has increased the demand for very small metal-air electrochemical cells. Such small cells are usually disc-like or pellet-like in appearance, and are about the size of garment buttons. These cells generally have diameters ranging from less than 0.25 inch up to about 1.0 inch, and height ranging from less than 0.15 inch up to about 0.60 inch. The small size and the limited amount of electrochemically reactive material which can be contained in these small metal-air cells result in considerable attention being directed to improving the efficiency and completeness of the power generating electrochemical reactions which occur therein.

Metal-air cells convert atmospheric oxygen to hydroxyl ions in the air cathode. The hydroxyl ions then migrate to the anode, where they cause the metal contained in the anode to oxidize. Usually the active anode material in such cells comprises zinc.

More particularly, the desired reaction in a metal-air cell air cathode involves the reduction of oxygen, the consumption of electrons, and the production of hydroxyl ions, the hydroxyl ions being able to migrate through the electrolyte toward the anode, where oxidation of zinc may occur, forming zinc oxide.

In most metal-air cells, air enters the cell through one or more ports extending through the bottom of the cathode can. The ports may be immediately adjacent the cathode assembly, or may be separated from the cathode assembly by an air chamber or an air diffusion member.

In any of such arrangements, the port: facilitates the movement of air from the outside environment into the cathode can, and thence into the cathode assembly. At the cathode assembly, the oxygen in the air reacts with water as a chemically reactive participant in the electrochemical reaction of the cell, and thereby forms hydroxyl ions.

In normal operation, the reaction surface of the cathode assembly is laden with electrolyte, water typically being a major constituent of the electrolyte. Accordingly, the water at the reaction surface of the cathode assembly has a vapor pressure, and is subject to evaporation at the reaction surface. Moisture evaporated from the reaction surface of the cathode assembly can escape from the cell through the port, whereby the cell dries out if the relative humidity is below the equilibrium humidity, and correspondingly loses effectiveness. Thus, there is a relationship between the amount of oxygen that can be made available to the cell through conventional port configurations, and the amount of moisture loss associated with such port configurations.

It is an object of this invention to provide improved cathode can structure for a metal-air electrochemical cell, the cathode can having one or more air entry ports so structured and configured, both individually and relative to each other, that the port configuration provides an improved relationship between the amount of oxygen that is available to the cathode assembly and the amount of moisture lost from the cell through the port configuration.

It is another object to provide improved cathode can structure for a metal-air electrochemical cell, wherein the sum of the open area of the port configuration is reduced while maintaining the cell limiting current.

It is still another object to provide improved cathode can structure for a metal-air electrochemical cell, the cathode can having a plurality of ports, with the port configuration structured so that, in a metal-air cell made with the cathode can, oxygen is more uniformly distributed over the cathode assembly, while minimizing the combined open area of the ports through the cathode can, and thereby reducing the amount of moisture transmitted into, or out of, the cell through the ports.

A further object is to provide improved metal-air electrochemical cells having an increase in the ratio of the limiting current of the cell to the combined area of gaseous ingress and egress available through the port configuration when the cell is in use.

Yet another object is to provide improved cathode can structure having ports with stepped port configurations, including a first larger port opening for facilitating air entry through a covering tab prior to the cell being put into use, and a second smaller port opening for limiting the air entrance and moisture loss while the cell is in use.

Still another object is to provide improved metal-air cells using the reduced port area for controlling ingress and egress of air when the cell is untabbed and in use, a covering tab having a permeability to air insufficient to maintain, over the reduced port area, an open cell voltage within the operating voltage range, the cell including ports incorporating stepped openings, thus presenting a tabbed diffusion area larger than the reduced port area.

SUMMARY OF THE DISCLOSURE

The ports on a given cathode can include a step in the port wall intermediate the inner and outer surfaces of the bottom wall of the cathode can. Thus, the port wall includes a first perimeter wall about the port, at the inner surface of the bottom of the cathode can, enclosing a first relatively smaller area, a second perimeter wall at the outer surface enclosing a second relatively larger area, and a connecting wall connecting the first and second perimeter walls. The area defined by the first perimeter wall provides a limited minimum open area for ingress of air containing cathodic oxygen, and egress of air depleted of oxygen, when the electrochemical cell is in use. The ports thus provide a larger diffusion area at the outer surface related to diffusion of air into and out of the cell through the covering tab prior to the cell being put into use, and a smaller diffusion area at the inner surface related to diffusion of air into and out of the cell when the cell is in use.

In the invention, a first family of embodiments comprehends an electrochemical metal-air cell, the electrochemical cell having a maximum sustained load voltage controlled by electrochemical reaction rate, and an open cell voltage, the electrochemical cell comprising an anode; a cathode, including a cathode can, the cathode can having a bottom, the bottom having an inner surface, an outer surface, and at least one port extending through the bottom, between the inner surface and the outer surface, the at least one port comprising a step therein, the step including a first perimeter wall at the inner surface enclosing a first relatively smaller area corresponding to a diameter of no more than 0.005 inch, a second perimeter wall at the outer surface enclosing a second relatively larger area, and a connecting wall connecting the first and second perimeter walls; and a tab sealed to the outer surface of the cathode can, covering the at least one port. In certain of these embodiments the open circuit: voltage with the tab sealed to the outer surface is no more than about 95% of the maximum sustained load voltage.

The open circuit voltage is preferably between about 70% and about 95%, more preferably between about 79% and about 93%, even more preferably between about 82% and about 90%, of the maximum sustained load voltage.

A second family of embodiments comprehends an electrochemical metal-air cell, comprising an anode; a cathode, including a cathode can, the cathode can having a bottom, an upstanding wall encompassing the bottom and, in combination with the bottom, defining an interior of the cathode can, the bottom having an inner surface, an outer surface, and one port extending through the bottom, between the inner surface and the outer surface, the one port defining a minimum area thereacross, for passage of air therethrough to the interior of the cathode can, the minimum area corresponding to a diameter of no more than about 0.0067 inch; and a tab sealed to the outer surface of the cathode can, covering the port, the tab having a permeability to air of about 50 cubic centimeters/100 inches square 24 hours to about 65 cubic centimeters/100 inches square 24 hours.

The tab preferably has a permeability to air of about 53 to about 60 cubic centimeters/100 inches square 24 hours. Preferably, the one port encompasses an area corresponding to a diameter of no more than 0.005 inch.

In some embodiments, the bottom of the cathode can includes at least two ports, the average minimum area of the at least two ports corresponding to a diameter of no more than about 0.009 inch.

Preferably, each port includes a step therein, including a first perimeter wall at the inner surface enclosing a first relatively smaller area, a second perimeter wall at the outer surface enclosing a second relatively larger area, and a connecting wall connecting the first and second perimeter walls.

It is preferred that each of the at least two ports have an area corresponding to a diameter of no more than 0.008 inch, preferably no more than 0.005 inch.

Where the bottom of the cathode can contains at least two holes, it is preferred that the ratio of the sum of the minimum areas of the ports to the area of the bottom be no more than about 0.001/1, preferably no more than about 0.0005/1.

Where the bottom of the cathode can contains at least two ports, and the limiting current is at least 7.5 milliamps, the ratio of the limiting current in milliamps to the sum of the areas of the at least two ports in millimeters squared is at least 100/1. Without the limitation of the limiting current being at least 7.5 milliamps, the invention comprehends the ratio of the limiting current in milliamps to the sum of the areas of the at least two ports in millimeters squared being at least 210/1.

Where the bottom of the cathode can contains at least 3 ports, the average minimum area of the at Least three ports corresponds to a diameter of no more than about 0.015 inch.

Where the bottom of the cathode can contains at least 3 ports, and has an outside diameter of at least about 0.25 inch, each port defines a minimum area thereacross, for passage of air therethrough to the interior of the cathode can, the average minimum area of the at least three ports corresponding to a diameter of no more than about 0.017 inch.

A third family of embodiments comprehends an electrochemical metal-air cell for use in an electrical appliance, the appliance having a minimum threshold voltage required for activating the appliance, the electrochemical cell having a maximum sustained load voltage related to the maximum sustained rate of electrochemical reactions therein, the electrochemical cell comprising an anode; a cathode, including a cathode can, the cathode can having a bottom, and an upstanding wall encompassing the bottom and, in combination with the bottom, defining an interior of the cathode can, the bottom having an inner surface, an outer surface, and at least one port extending through the bottom, between the inner surface and the outer surface, the at least one port defining a minimum area thereacross corresponding to a diameter of no more than 0.017 inch, for passage of air therethrough to the interior of the cathode can; and a tab sealed to the outer surface of the cathode can, covering the at least one port, the at least one port comprising a step therein, including a first perimeter wall at said inner surface enclosing a first relatively smaller area, a second perimeter wall at said outer surface enclosing a second relatively larger area, and a connecting wall connecting said first and second perimeter walls.

Preferably, the open cell voltage of the electrochemical cell with the tab sealed to the outer surface of the cathode can is between the minimum threshold voltage required for activation of the appliance and 95%, preferably 90%, of the maximum sustained load voltage of the electrochemical cell. Typically, the open cell voltage is from about 70% to about 90% of the maximum sustained load voltage of the electrochemical cell.

DETAILED DESCRIPTION OF THE ILLUSTRATED EMBODIMENTS

Figure 1:
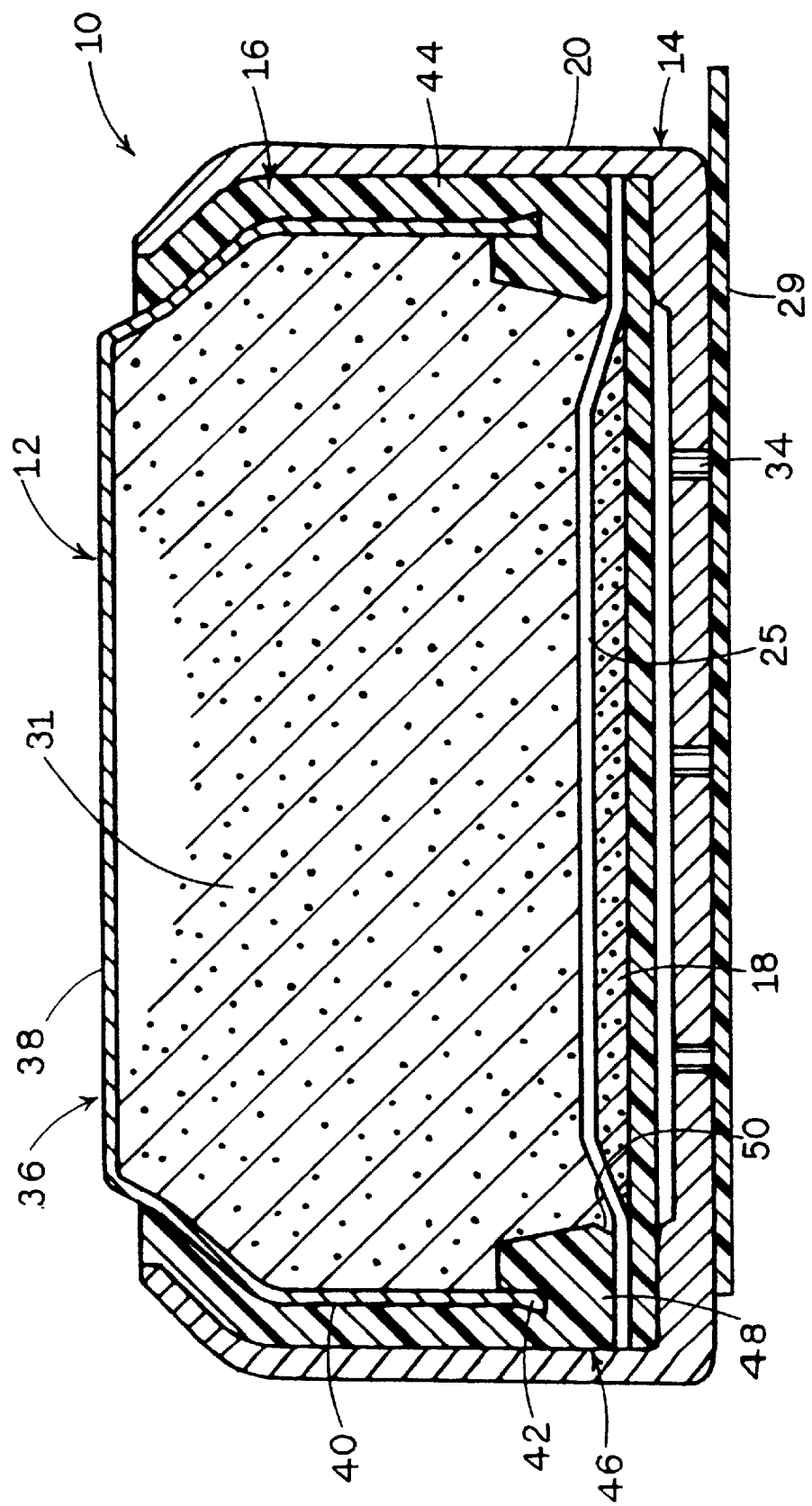
FIG. 1 shows a cross-section of a typical metal-air electrochemical cell of the invention.

Referring now by characters of reference to the drawings, FIG. 1 generally represents a cross-section of a metal-air cell 10, preferably a zinc-air cell, of the present invention. The negative electrode 12, also referred to as the anode 12, is electrically insulated from the positive electrode 14, also referred to as the cathode, by a seal 16, typically made from nylon or similar material.

Cathode 14 includes a cathode assembly 18, contained within cathode can 20. Cathode can 20 has a bottom 22, and circumferential upstanding side wall 24 extending upwardly from the bottom. The cathode assembly 18 includes a current collector and catalytic carbon or similar material. A barrier layer 25, typically polypropylene, spaces the reactive anode material 31 from the cathode assembly. An air diffusion layer, typically polytetrafluoroethylene (PTFE), is disposed on the surface of the cathode assembly adjacent the inner surface 28 of the bottom 22 of the cathode can, and generally fills air reservoir 52. See FIG. 5.

The inner and outer surfaces 30, 32 respectively of side wall 24 of the cathode can extend about the circumference of the cathode can, defining side wall 24 between them.

Bottom 22 of the cathode can typically has an outer surface 26, an inner surface 28, and a thickness "T" between the inner surface 28 and the outer surface 26.

Referring to FIGS. 1–3 and 5, ports 34 extend through the bottom 22 of the can, between the outside surface 26 and the inside surface 28.

A semi-permeable tab 29 covers the ports 34. Tab 29. acts as a porous flow restrictor, restricting the flow of cathodic oxygen into the cell before the cell is put into use. When the cell 10 is to be put into use, tab 29 is removed, whereupon cathodic oxygen reaches ports 34 without the restriction previously imposed by tab 29. A suitable such tab is disclosed in U.S. Pat. No. 4,649,090 Oltman et al, herein incorporated by reference in its entirety for teaching as to the tab and tab material.

The anode includes an anode can 36, which includes a top 38, and side wall 40 depending downwardly from the top 38, to a foot 42 at the bottom of side wall 40.

Seal 16 has a side wall 44 extending about the inner perimeter of the cell 10, between the outer surface of side wall 40 of the anode can and the inner surface 30 of side wall 24 of the cathode can, and downwardly to a lower end 46 of the seal, near the inner surface 28 of the bottom 22 of the cathode can.

At the lower end 46 of the seal, a grommet 48 of seal 16 extends inwardly from the inner surface 30 of the side wall 24 of the cathode can, and under the foot 42 of side wall 40 of the anode can. Thus, the grommet 48 of the seal 16 is interposed between the foot 42 of side wall 40 of the anode can and the inner surface 28 of the bottom 22 of the cathode can. Grommet 48 extends about the entire inner perimeter of the cell 10, adjacent cathode assembly 18, defining the active area of the cathode assembly inside the inner edge 50 of grommet 48.

While grommet 48 of seal 16 provides a desirable sealing function, the grommet 48 generally blocks off, from participation in the electrochemical reaction, that area of the cathode assembly 18 which is disposed between grommet 48 and the inner surface 28 of the bottom 22 of the cathode can. Accordingly, that portion of the cathode assembly 18 which is; inside the inner edge 50 of the grommet 48 is available to participate in the electrochemical reaction of the cell, and is referred to herein as the cathode reaction surface 54. The cathode reaction surface, of course, has a mathematically defined area which is referred to herein as the reaction area.

The reaction surface of the cathode assembly must have access to oxygen from the air surrounding the cell in order for a metal-air cell to operate as intended. Accordingly, the cell has an air entry port 34 which allows air to enter the cell. Correspondingly, since the air is about 20% oxygen, and since oxygen is the major component of the air consumed by the cell, the air inside the cell, in air reservoir 52 is continuously replenished by oxygen-laden air from outside the cell whenever the cell is in operation. Thus, the air entry port functions as an entry port for oxygen-laden air and may function as an exit port for oxygen-depleted air.

As oxygen is consumed at the reaction surface of the cathode assembly 18, an oxygen partial pressure gradient is set up in the air reservoir 52. The partial pressure of oxygen is thus relatively lower adjacent the reaction surface, and is relatively higher further away from the reaction surface. This partial pressure gradient sets up a gradient-driven diffusion of oxygen toward the reaction surface, and corresponding ingress of at least oxygen at the ports 34.

Figure 4:
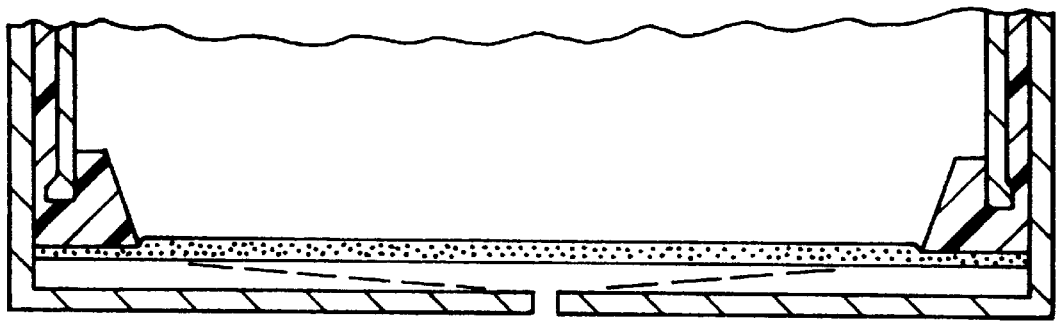
FIG. 4 is a partial section view of a prior art cell outlining a typical air plume in the air reservoir.

As oxygen enters the cell through a port, it tends to spread out over the reaction surface 54, supplying necessary cathodic oxygen to the reaction surface. The spreading of the oxygen over the reaction surface is illustrated in prior art FIG. 4 as a pair of divergent dashed lines describing a wide-angle cone extending from a single port, and may resemble, in three dimensional view, a plume extending from an orifice. Note in FIG. 4, the relatively long distance between the single port and the outer edges of the plume.

Figure 2:
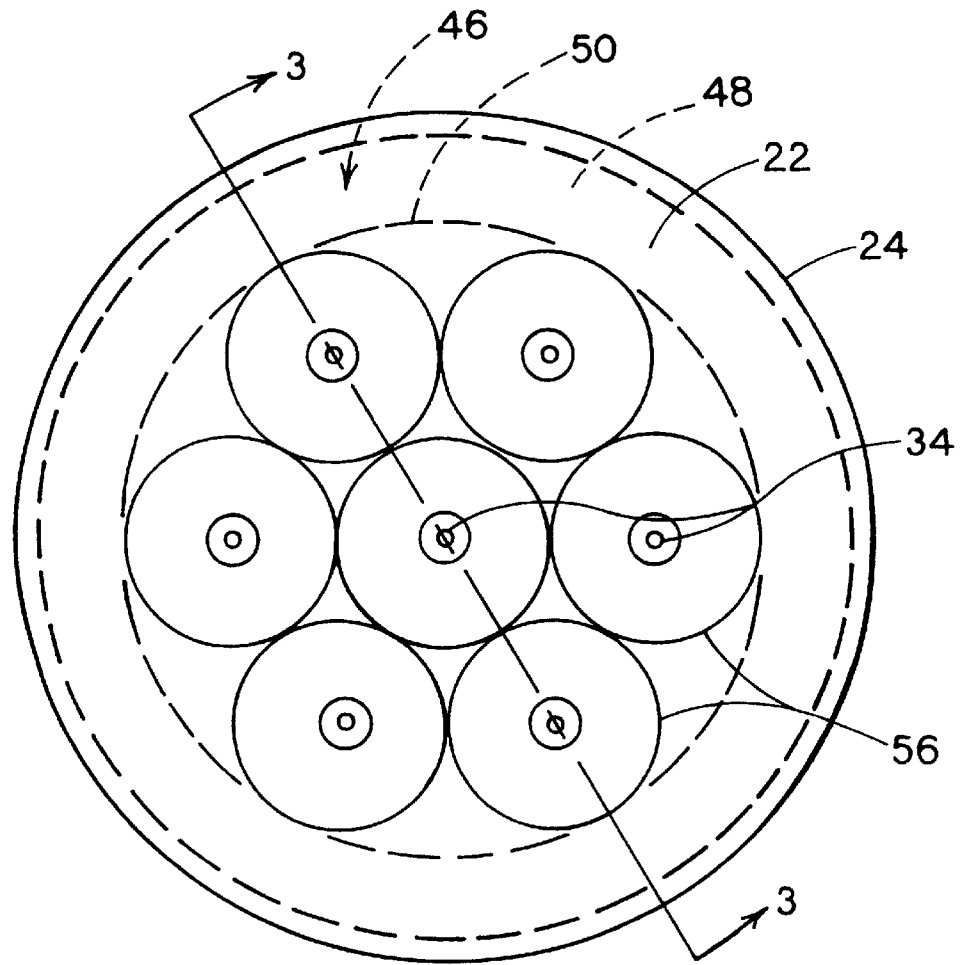
FIG. 2 is a bottom view of the cell of FIG. 1, showing a representation of a typical hypothetical footprint on the cathode assembly.
Figure 3:
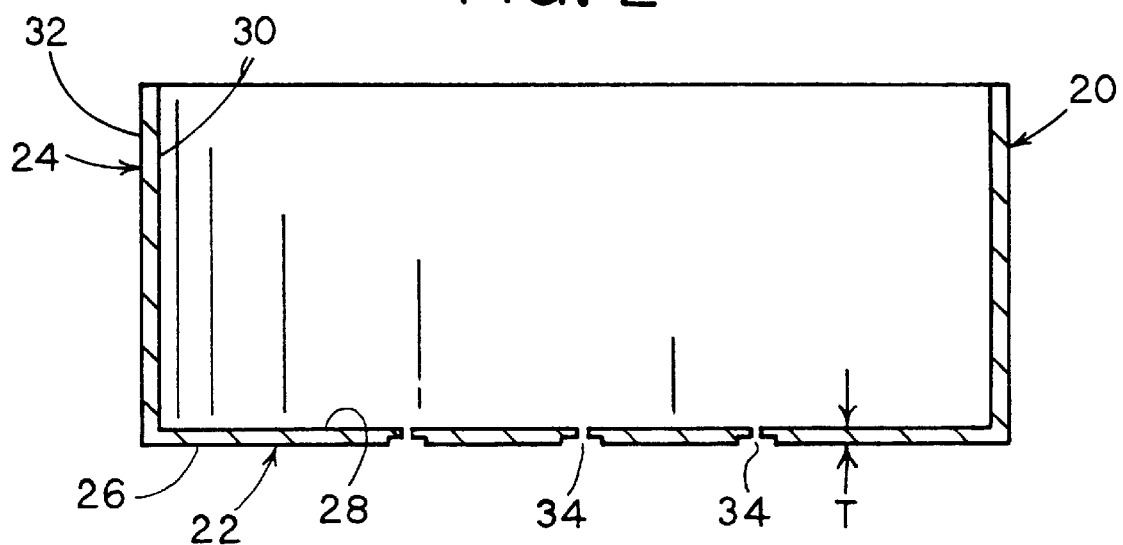
FIG. 3 is a cross-section of the cathode can of FIG. 2, taken at 3—3 of FIG. 2.
Figure 5:
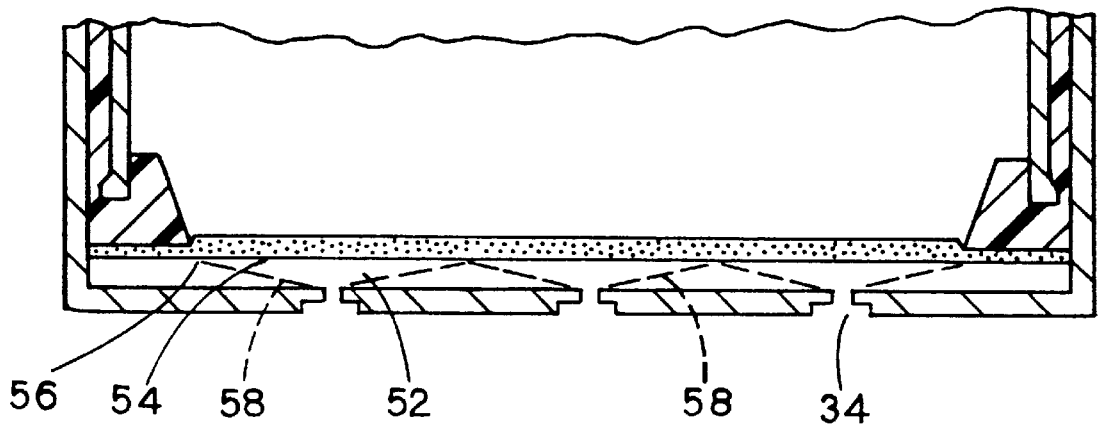
FIG. 5 is a partial section view of a cell of the invention showing typical multiple air plumes in the air reservoir.

FIGS. 2 and 5, in combination, illustrate the relatively shorter distance between each of the multiple ports 34 and the outer edges of the respective plumes. Each of the 7 larger circles in the central portion of FIG. 2 represents the outer edge of the imaginary enclosed area 56 of a corresponding plume 58 at the intersection of the plume with the reaction surface of the cathode assembly. The circles are, of course, imaginary and are not visible on the reaction surface 54. They are instructive, however, regarding the distribution of oxygen in the air reservoir 52.

The arrangement of the ports 34 relative to each other is a simple study of close packing of enclosed 2-dimensional bodies inside a confining perimeter, to make a closely packed arrangement e.g. a footprint on the reaction surface. The oxygen, of course, diffuses throughout the air reservoir, to reach all areas of the entire reaction surface. However, the diffusion is most efficient within the imaginary circular outlines of the plumes 58 projected from the respective ports 34

The PTFE air diffusion layer is generally in surface-to-surface contact with the inner surface 28 of the bottom of the cathode can, filling the air reservoir 52 which is disposed between the inner surface 28 of the cathode can and the reaction surface. The air diffusion layer is not shown in order to avoid unnecessary complexity in the illustrations. Those skilled in the art are well versed in such layers, and thus can well apply them as needed.

The air reservoir 52 serves as an accumulation chamber, holding enough oxygen "oxidizer" to provide for a temporary increase in the current-producing capability of the cell, sometimes also referred to as the "pulse" capability of the cell. Air reservoir 52 also serves as a damping chamber to attenuate any variation in the rate at which oxygen enters the air reservoir.

There are both positive and negative aspects to exposing the reaction surface of the cathode assembly to ambient air. First, a positive aspect of exposing the reaction surface to ambient air is that such exposure is critical to the operation of the cell, in that the air provides the reacting cathodic oxygen which is required for normal and intended operation of the cell. Second, a negative aspect of exposing the reaction surface to ambient air is that the moisture in the electrolyte at the reaction surface can evaporate from the reaction surface, resulting in moisture loss to the cell. Third, in high humidity conditions, excess moisture can collect on the reaction surface, thus undesirably diluting the composition of the electrolyte at the reaction surface.

For oxygen to react at the reaction surface of the cathode assembly, the reaction surface must be wetted by the cell electrolyte. The cell electrolyte is typically a combination of potassium hydroxide, water, and other additives well known in the art. In accord with such an electrolyte, the water exerts a partial vapor pressure based on the amount of water in the electrolyte, and on its interactions with the other components of the electrolyte.

In a typical such electrolyte based on potassium hydroxide, the partial vapor pressure of the water in the electrolyte equates to a relative humidity of more or less 58%. Thus, in such a cell, a steady state condition of 58% relative humidity in the air reservoir 52 would result in no net evaporation of water from the reaction surface. This can represent an ideal operating environment for the cell. To the extent the relative humidity outside the cell is less than 58%, moisture tends to evaporate from the reaction surface, and migrate out of the cell, such that the cell tends to dry out. If enough moisture is lost in this manner, the cell may cease to operate before the reaction materials are all used up, because of inadequate moisture in the cell to support normal cell operation.

To the extent the relative humidity outside the cell is greater than 58%, excess moisture tends to accumulate on the reaction surface, and correspondingly to migrate into the cell. This additional moisture on the reaction surface has the effect of diluting the concentration of potassium hydroxide at the reaction surface, whereby the electrolyte concentration at the reaction surface becomes inadequate to support normal operation of the cell. In this situation, too, the cell may prematurely cease to operate properly.

Relative humidity in ambient air varies significantly from place to place and, at any given place can change rapidly. Thus, electrochemical cells such as the class of metal-air cells addressed by the invention, are exposed to a wide variety of ambient relative humidities, and may be exposed to a rapidly-changing condition of ambient relative humidity. This, correspondingly, may subject any given cell to any or all of a wide range of potentially rapidly changing relative humidity gradients between the air reservoir 52 and the ambient outside air. Movement of moisture into, or out of, air reservoir 52 depends on Knudsen Diffusion which, being dependent on Brownian movement, is proportional to the total of the cross-sectional areas of the ports. Movement of oxygen into the cell, on the other hand, is also driven by Fick's law of diffusion which addresses the depleted oxygen partial pressure at the reaction surface.

To the extent the open cross-sectional area of the ports is large, relative humidity equilibrium between ambient air and the air reservoir is reached rather quickly, such that 95% of an initial relative humidity differential may be eliminated in a few days, whereby the relative humidity inside the cell approaches ambient relative humidity; never the reverse. To the extent the cross-sectional area of the ports 34 is reduced, it takes longer to reach relative humidity equilibrium, for example 2 weeks to 2 months to reach a corresponding 95% attenuation of a relative humidity differential representing at least 30 relative humidity percent. The longer time for reaching relative humidity equilibrium, whereby the relative humidity inside the cell is maintained generally closer to ideal conditions for a relatively longer period of time, results in improved cell performance over that longer period of time. In preferred cells 10 of the invention, having reduced-size ports, it typically takes at least 30 days to reach 95% attenuation of a relative humidity differential of at least 30 relative humidity percent.

In general, the rate at which air can enter the air reservoir through the port, and the rate at which moisture vapor and oxygen-depleted air can exit the air reservoir through the port, depends on the configuration and arrangement of the port or ports. Known cells have one or more such ports. However, the art is deficient in teaching the relationship between ingress of oxygen laden air, exhausting of oxygen depleted air, and traverse of moisture vapor through the port into and out of the air reservoir 52.

In general, a port 34 extends through the bottom 22 of the cathode can, providing a route of access for air to travel from outside the cathode can to the air reservoir 52 an the inside of the cathode can. Preferably, port 34 is generally round in shape, such that it has a diameter extending thereacross. Thus, each port defines an included cross-sectional area, such that one can measure the diameter of each port, calculate the area of each port, and thus arrive at a composite sum of the area represented by all of the ports 34.

For a given cell size and structure, the amount of moisture lost from the cell, relative to the amount of electricity produced, can be reduced by using a plurality of spaced smaller ports in place of the conventionally used larger ports. Considering known electrical performance characteristics for a given cell, and considering a standard port configuration, cell electrical performance characteristics can be maintained while the weight loss, and corresponding loss of electrical performance, due to moisture evaporation is reduced, by increasing the number of ports 34 while reducing the composite sum of the area represented by all of the ports.

EXAMPLE 1

Two cells were constructed according to size PR44 of the International Electrochemical Commission (IEC). The first cell was constructed having three ports 34, each 0.018 inch diameter at the smallest cross-dimension, for a total area of 0.5 millimeter squared represented by all the ports. A second, otherwise identical cell was constructed having 6 ports 34, each 0.010 inch diameter at the smallest cross-dimension, for a 40% smaller total area of 0.3 millimeter squared represented by all the ports. The limiting current of the first cell, with the 3 larger ports, was 39.0 milliamps; that of the second cell, with the 6 smaller ports, was 38.2 milliamps. Standard deviation was 3 milliamps, whereby the limiting currents of the two cells were statistically indistinguishable from each other.

Both cells were subjected to identical conditions of 2% relative humidity for 14 days. Weight loss of the first cell was 26.8 milligrams, while that of the second cell was only 23.8 milligrams. Thus, by dividing up the port area into 6 ports instead of 3 ports, and correspondingly reducing the overall total area represented by the ports, the current capability of the cell was maintained while the moisture loss was reduced by 11%.

Figure 6:
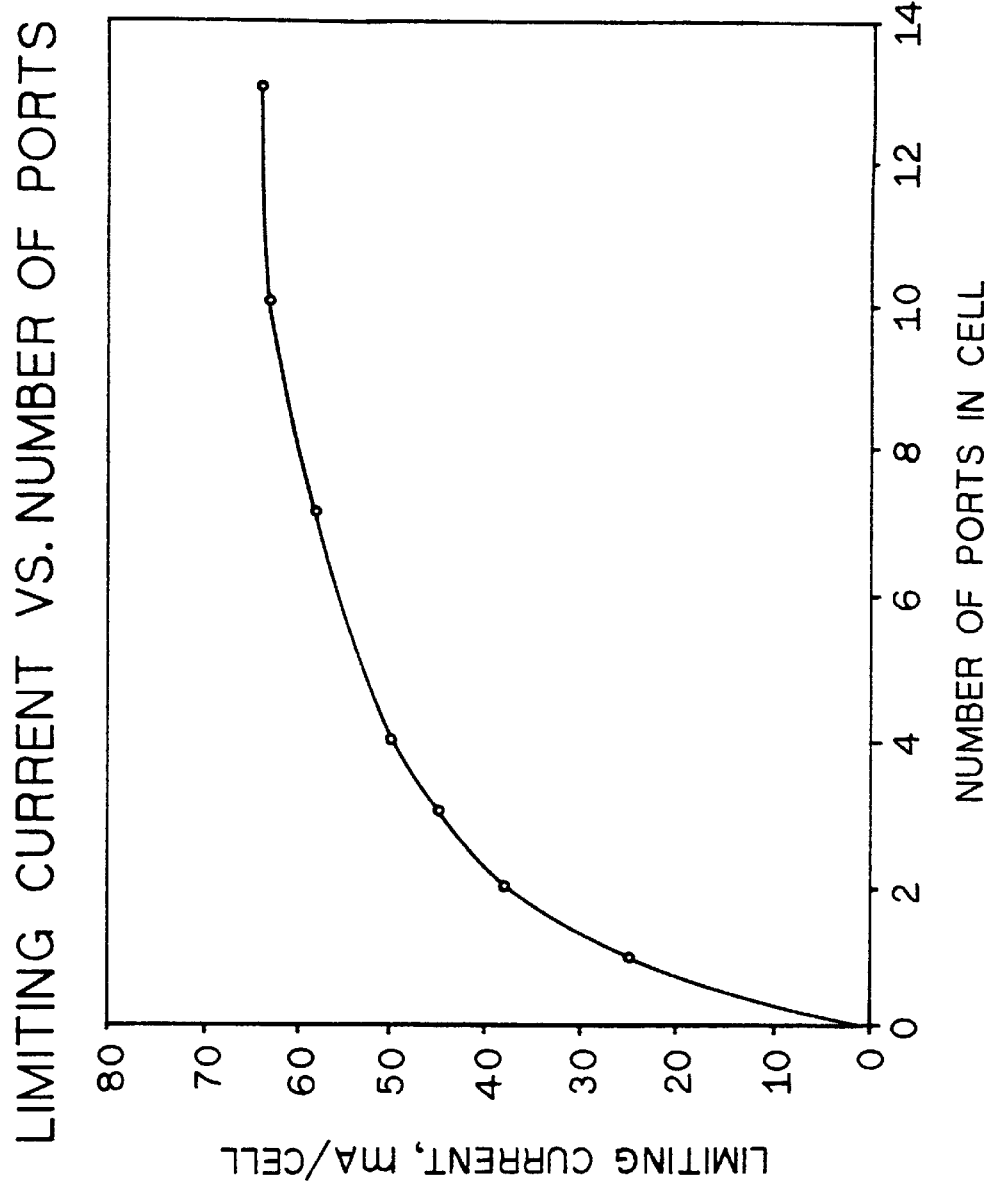
FIG. 6 is a graph showing the relationship between limiting current of a metal-air cell in use and the number of air entry ports in the bottom of the cathode can, while holding constant the combined area of all the ports.
Figure 7:
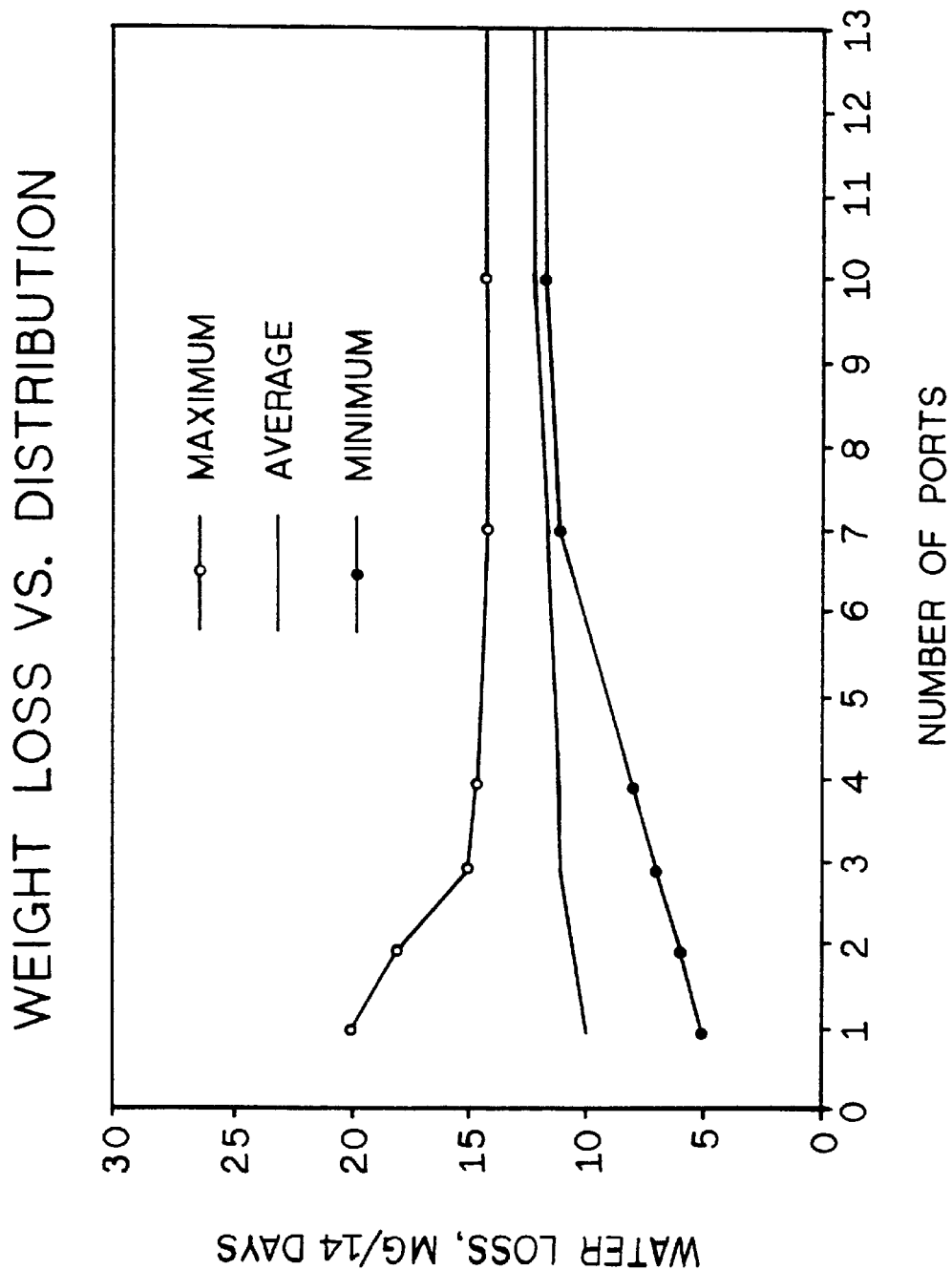
FIG. 7 is a graph showing weight loss of the cells referred to in FIG. 6.

FIG. 6 shows in general the relationship between the number of ports and the limiting current of the cell. As seen in FIG. 6, as the number of ports is increased, while maintaining constant the total area represented by the smallest cross-dimension of each of the ports 34, the limiting current of the cell rises, from a low of about 24 milliamps with a single port, to a high of about 60 milliamps with 13 ports. FIG. 7 shows corresponding representation of the weight loss Of the cells in the 14 day weight loss test, showing that weight loss remained relatively constant. At the same time, the limiting current increased over 100%, from 24 milliamps to 60 milliamps.

The cells used to generate the data represented in FIGS. 6 and 7 were zinc air cells, such as those illustrated in FIG. 1. Outside perimeter of each cell was 0.610 inch. The diameter of the reaction surface of the cathode assembly was 0.500 inch. The corresponding area of the reaction surface was 1.27 centimeters squared. Total area of the ports was, in all cases, 0.0593 millimeter squared. Cells were made having from 1 port to 13 ports. But the total area for all the ports in any one cell was the same 0.0593 millimeter squared. Thus, as the number of ports was increased, the sizes of the corresponding ports was smaller. The ports were distributed over the surfaces of the bottoms of the respective cathode cans, evenly about the area described on each can inside the inner edge 50 of the grommet 48 of the respective seal 16.

The number of ports, and the diameters of the respective ports are shown in the following Table 1.

TABLE 1

| Number of Ports | Diameter Inches |
|---|---|
| 1 | .0108 |
| 2 | .0076 |
| 3 | .0062 |
| 4 | .0054 |
| 7 | .0041 |
| 10 | .0034 |
| 13 | .0030 |

Thus, FIGS. 6 and 7 illustrate the principle that distributing the area of the opening provided by the ports, over an increasing number of ports, results in an increased capacity, measurable at least in terms of the limiting current of the cell. FIG. 7 illustrates the general principle that the moisture loss is not correspondingly increased. Rather, moisture loss remains relatively constant.

Figure 8:
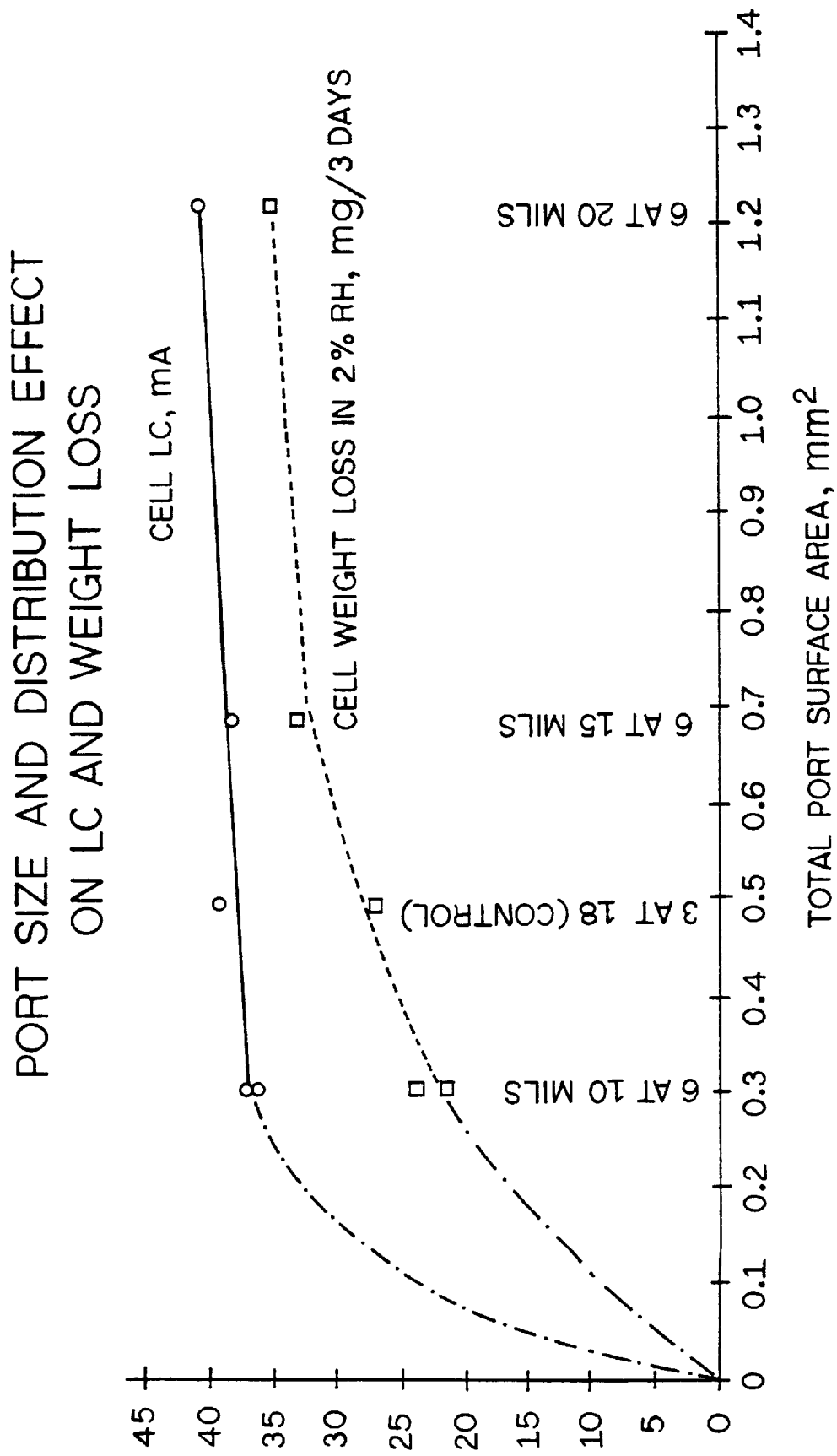
FIG. 8 is a graph illustrating both the limiting current and the cell weight loss as a function of the total open surface area of the ports, and related to the number of ports.

FIG. 8 further illustrates the negative effect of making the ports 34 larger than necessary. The cells used were size PR44, according to standards of the IEC. A preferred cell of the invention having 6 ports, each 0.010 inch diameter, is represented in FIG. 8 as having total area of its ports of 0.3 millimeter squared. Two other data points are shown, at approximately 0.7 and 1.2 millimeter squared total area, having the same number of ports (6), but wherein the ports are larger at 0.015 and 0.020 inch diameter. A standard cell, not of the invention, having 3 ports, 0.018 inch diameter is also shown as a control at approximately area 0.5 millimeter squared.

FIG. 8 illustrates at least three points. First, FIG. 8 illustrates that the limiting current of the cell can be maintained while reducing the combined area of the parts, by increasing the number of ports, while at the same time reducing moisture loss. Second, it shows that maintaining the number of ports, and increasing the size of the ports does not necessarily result in an increase in limiting current. Third, FIG. 8 illustrates the converging relationship between limiting current and moisture loss as the total surface area of the ports is increased, and the corresponding divergence of limiting current and moisture loss as total surface area of the ports is decreased.

Note in FIG. 8 that the combination dashed/dotted lines representing total port surface area less than 0.3 millimeter squared show only theoretical representations linking the actual data at 0.3 to the fact that the limiting current and the weight loss due to evaporation both approach zero as total port surface area approaches zero.

Tables 2–4 show data for cells using ports whose diameters are relatively constant between inner and outer surfaces 28, 26, respectively, namely Examples 2, 12, and 24. Corresponding data are shown for conventionally known cells, not of the invention, namely Examples 3c–11c, 13c–23c, and 25c–32c. Each of Tables 2–4 represents a separate cell size. Each of the examples of conventional cells, in each table, represents a different manufacturer of commercially available cells, the samples being secured generally within 24 months of submission of the application herein. Descriptions for abbreviations in all three tables are at the end of Table 4.

TABLE 2

Size = PR44.
Active Area, A = .701 cm².
Cell OD = .453 inch

| Ex. No. | No. Ports | Port Dia. Inch | Port Area mm² | LC mA | LC/A | Dp/Dc | Ap/Ac |
|---|---|---|---|---|---|---|---|
| 2 | 6 | .00973 | .288 | 37.7 | 131 | 21.5 | .068 |
| 3c | 3 | .0184 | .513 | 32.0 | 62.4 | 40.5 | .244 |
| 4c | 4 | .0196 | .781 | 41.1 | 52.7 | 43.3 | .278 |
| 5c | 2 | .0158 | .251 | 24.6 | 97.9 | 34.8 | .179 |
| 6c | 2 | .0199 | .399 | 23.7 | 59.4 | 43.8 | .285 |
| 7c | 3 | .0230 | .802 | 34.1 | 42.5 | 50.7 | .381 |
| 8c | 2 | .0175 | .309 | 19.2 | 62.2 | 38.5 | .220 |
| 9c | 2 | .0170 | .293 | 12.0 | 41.0 | 37.5 | .209 |
| 10c | 2 | .0147 | .218 | 15.7 | 72.2 | 32.3 | .155 |
| 11c | 2 | .0169 | .289 | 13.8 | 47.7 | 37.3 | .206 |

TABLE 3

Size = PR48.
Active Area A = .289 cm².
Cell OD = .305 inch

| Ex. No. | No. Ports | Port Dia. Inch | Port Area mm² | LC mA | LC/A | Dp/Dc | Ap/Ac |
|---|---|---|---|---|---|---|---|
| 12 | 4 | .0050 | .051 | 9.0 | 177 | 16.4 | .044 |
| 13c | 2 | .0186 | .351 | 15.0 | 42.8 | 61.0 | .607 |
| 14c | 2 | .0181 | .332 | 13.8 | 41.6 | 59.3 | .574 |
| 15c | 2 | .0173 | .303 | 16.5 | 54.4 | 56.7 | .525 |
| 16c | 2 | .0176 | .314 | 16.3 | 51.9 | 57.7 | .543 |
| 17c | 1 | .0178 | .161 | 6.0 | 37.4 | 58.4 | .556 |
| 18c | 2 | .0196 | .389 | 13.9 | 35.7 | 64.3 | .674 |
| 19c | 1 | .0185 | .173 | 9.7 | 55.9 | 60.7 | .600 |
| 20c | 1 | .0187 | .177 | 10.4 | 58.7 | 61.3 | .613 |
| 21c | 1 | .0158 | .126 | 7.5 | 59.3 | 51.8 | .438 |
| 22c | 1 | .0187 | .177 | 7.4 | 41.8 | 61.3 | .613 |
| 23c | 1 | .0131 | .087 | 6.0 | 69.0 | 43.0 | .301 |

TABLE 4

Size = PR41.
Active Area A = .288 cm².
Cell OD = .304 inch

| Ex. No. | No. Ports | Port Dia. Inch | Port Area mm² | LC mA | LC/A | Dp/Dc | Ap/Ac | Pa/Ac |
|---|---|---|---|---|---|---|---|---|
| 24 | 3 | .0050 | .038 | 9.8 | 257 | 16.4 | .044 | .0008/1 |
| 25c | 1 | .0106 | .057 | 10.6 | 15.1 | 34.9 | .198 | .0012/1 |

TABLE 4-continued

Size = PR41.
Active Area A = .288 cm².
Cell OD = .304 inch

| Ex. No. | No. Ports | Port Dia. Inch | Port Area mm² | LC mA | LC/A | Dp/Dc | Ap/Ac | Pa/Ac |
|---|---|---|---|---|---|---|---|---|
| 26c | 2 | .0101 | .103 | 8.6 | 83.2 | 33.2 | .179 | .0022/1 |
| 27c | 1 | .0208 | .219 | 12.1 | 55.2 | 68.4 | .761 | .0047/1 |
| 28c | 1 | .0193 | .189 | 12.6 | 66.8 | 63.5 | .655 | .0040/1 |
| 29c | 1 | .0178 | .161 | 6.9 | 43.0 | 58.6 | .557 | .0034/1 |
| 30c | 1 | .0083 | .035 | 7.0 | 200 | 27.3 | .121 | .00075/1 |
| 31c | 1 | .0172 | .150 | 6.4 | 42.7 | 56.6 | .321 | .0032/1 |
| 32c | 1 | .0176 | .157 | 7.0 | 44.6 | 57.9 | .545 | .0034/1 |

LC = Limiting Current.
Dp = Diameter of the ports.
Dc = Outside perimeter of the cell, measured on the cathode can.
Ap = Area of one port.
Ac = Area of the cathode can, based on Dc.
Pa = Sum of the areas of all ports As used herein, including in the claims that follow, measurements of "limiting current" are taken at an emf of 0.9 volt.

Tables 2–4 demonstrate that the cells of the invention using relatively constant-diameter, reduced size ports 34 are superior to conventional cells, in terms of the ratio of the limiting current to total area of the ports. Within each cell size, the respective cells 2, 12, and 24 of the invention have the smallest ratio of the inner area/diameter of each port to area/diameter of the cell. They also have the smallest ratio of area of one part opening to area of the bottom of the cell. By limiting the relative size of the port openings, and thus the relative areas of the port openings, the moisture loss is correspondingly limited. In Tables 2 and 3, the cells of the invention have the smallest total area of all the ports in a single cell. In Table 4, see Comparative Example 30 for a cell which has a comparable total area of 0.035 mm² with one port, compared with the cell of the invention (Ex.24) which has an area of 0.038 mm², but wherein the cell of the invention, with 3 ports, has a limiting current 28% greater than the conventional cell of Comparative Example 30. Thus, the comparison of Example 24 with Comparative Example 30 further illustrates that distributing a given port opening area over a multiplicity of ports can result in an increase in limiting current.

Examples 2, 12, and 24 suggest that the preferred port opening depends in part on the absolute size of the imaginary closed area 56 represented by the intersection of the plume 58 with the reaction surface 54. Assuming each port supports an equal proportion of the reaction surface, each port in Example 2 supports 0.711/6=0.119 cm² of the reaction surface while each port in Examples 12 and 24 supports 0.072 cm² and 0.096 cm² respectively. Thus, in general, the smaller the area of the reaction surface to be supported by each port, the smaller the port size can be.

Following the empirical data of e.g. FIG. 6 to its logical conclusion, the ideal port configuration comprises an infinitely large number of ports evenly distributed on the bottom 22, adjacent reaction surface 54, each port being infinitesimally small in size.

However, from a practical standpoint, the actual number of ports will always be finite, and will be governed at least in part by the incremental increase in cell productivity to be achieved by adding one more port, or an incremental series of ports. Again referring to FIG. 6, the incremental increase in limiting current that results from an incremental increase in the number of ports follows a pattern of diminishing returns as the number of ports is increased. Thus, for the cell represented in FIG. 6, no substantial benefit would be obtained from using more than 10 ports, and even fewer ports may be preferred when the incremental cost of making more and smaller ports is considered.

The specific number of ports, and the specific size of the ports, will of course, depend on the size of the cell (reaction surface) and the performance characteristics demanded of the cell. However, for every standard size metal-air cell known to the inventors, the ratio of limiting current to moisture loss can be increased over a standard diameter single port by distributing the port area over at least two ports, and correspondingly reducing the total port area.

Port size has been discussed herein with respect to diameter, implying a circular port opening, which is preferred. However, any shape opening can be used, such as square, elliptical, etc. While some modest adaptation of the invention would be suggested, the same principles apply to such divergent shapes.

In general, ports in the cathode cans, and corresponding cells, of the invention range in size from about 0.001 inch diameter to about 0.017 inch. However, any amount of reduction in port area from conventionally used port configurations, when coupled with dividing that area over a greater number of ports, can result in increased limiting current while maintaining constant the moisture loss. Correspondingly, moisture loss may be reduced by dividing the port area over a greater number of ports, and reducing the total port area enough that the limiting current is maintained constant. The net result is less total port area, which results in less moisture loss, with the previous limiting current.

If only one port is used, benefit is generally obtained over conventional port configurations to the extent port diameter is no more than 0.0067 inch. If two ports are used, benefit is obtained so long as the port diameter is no more than about 0.009 inch to about 0.010 inch. Where three or more ports are used, benefit is obtained so long as the port diameter is no more than 0.017 inch. As suggested by Examples 2, 12, and 24, preferred port diameters typically range from about 0.005 inch to about 0.010 inch.

Thus, since any reduction in the area of the reaction surface to be supported by each port leads to a more efficient utilization of the port in terms of limiting current, moisture loss, or both, the above recited relationships between port size and number of ports, are only illustrative of the improvements that are obtained by increasing the number of ports and/or reducing the sum of the port areas, whereby all sizes of ports and all numbers of ports, wherein the resulting area of the reaction surface to be supported by each port is reduced, are included in the invention, and are subject to claiming herein.

Cathode cans 20 of the invention can be made using a variety of metal structures. Plating materials and ductility are the important characteristics of the cathode can. The can may be formed of virtually any metal that is plated or clad with the appropriate metal, such appropriate metal having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

Optionally, the can 20 may be formed entirely of a metal or alloy having a hydrogen overvoltage similar to that of the electrode (as opposed to plating or cladding the can) In addition to nickel, stainless steel, palladium, silver, platinum, and gold may be suitable plating, cladding, or can materials. Steel strip plated with nickel and nickel alloy is generally used because the cost is low, and because pre-plated steel strip, which generally requires no post-plating processing, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other specific examples of materials for cathode cans include nickel-clad stainless steel; nickel-plated stainless steel; INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, division of INCO, Huntington, W.Va. Some noble metals may also find use as plating, cladding, or can metals, including steel strip plated with nickel, and mild steel strip subsequently plated with nickel after forming the can.

Cathode cans of the invention can be made using sheet material which is the conventional 0.008 inch to 0.012 inch thick. Preferred sheet material thickness is less, for example about 0.0065 inch. In any event, where the smaller ports are used, e.g. 0.005 inch diameter, the diameter of a given port can be less than the thickness of the sheet material in which it is made. For example, where metal thickness is 0.0065 inch and port diameter is 0.005 inch, the port diameter is only 77% as large as the metal thickness.

The reduced size ports of the invention can be made using a variety of known processes such as impact punch, punch and peen, water jet focused through sapphire, laser piercing, and the like. Those skilled in the art can select the desired process based on their own preferences and skills, and economic aspects of practicing the respective processes.

Perceived utility of the cell is critical to consumer satisfaction with the cell when the cell is placed into service. To put a cell into service, the consumer removes the tab 29, exposing the ports 34 directly to cathodic oxygen. As oxygen enters the cathode through the ports, the cell responds by increasing the electrochemical potential, as open cell voltage, from whatever open cell voltage existed before the tab was removed, to the voltage at full electrochemical potential of the cell.

However, for the consumer to perceive the electrochemical activity, and thus the utility of the cell, the cell must reach the threshold minimum potential necessary for functioning in the appliance in which the cell is being used. The amount of time required for the cell to reach the threshold minimum potential should be short so the consumer readily perceives the cell's utility. If too much time elapses before the minimum threshold potential is reached, the consumer may conclude that the cell is inoperative and throw it away.

Thus, it is critical to consumer satisfaction that the cell respond quickly when the tab is removed, by quickly reaching the threshold operating potential of the appliance in which it is being used. A common use for such cells is in hearing aids. Typically, such hearing aids require a minimum threshold potential of about 1.0 to about 1.1 volt. Such cells typically have a voltage at full electrochemical potential of about 1.4 volts. Thus the useful range of voltages for the illustrated use of such cells is from about 1.0 volt to about 1.4 volts. To the extent the voltage is less than about 1.0 volt, the consumer perceives the cell as "dead." Correspondingly, for any given cell, it is important that the cell quickly reach a sustainable load voltage of at least about 1.0 to about 1.1 volt, namely about 71% to about 79% of the electrochemical potential of the cell, so that the cell be perceived as "good" at the time the cell is placed into service. For a cell to have such a sustainable load voltage, it is desirable that the cell have a somewhat higher open circuit voltage before the load is applied. Typically preferred such open circuit voltage is at least about 1.2 volts to about 1.3 volts, namely about 86% to about 93% of the electrochemical potential of the cell.

Secondary chemical reactions not directly related to generation of electrochemical energy begin proceeding in the cell as soon as the cell is constructed, consuming whatever oxygen is contained in the cell at the cathode when the cell is assembled, and consuming zinc in the anode to produce zinc oxide. If the oxygen is not replaced, the depletion of oxygen at the cathode depletes the amount of oxygen available to support maintenance of a satisfactory open circuit voltage, which may result in the cell having an open circuit voltage so low that the consumer will perceive the cell as "dead" when the cell is placed into use, even though the cell is in fact "good" albeit not yet fully "charged" to the functional minimum threshold voltage.

In order to keep a cell properly charged to an acceptable open cell voltage while the cell is in storage prior to use, the oxygen being consumed by the secondary chemical reactions is replaced through ports 34. However, to the extent the cathode has unlimited access to oxygen, the secondary reactions accelerate, consuming even more of the anodic zinc. Since the amount of zinc that can participate in an electrochemical reaction controls the overall capacity of the cell, unnecessary use of zinc is detrimental to the overall capacity of the cell.

Thus, while oxygen must be supplied to the cathode to maintain satisfactory open cell voltage, the amount of oxygen supplied to the cathode should be controlled so that the anodic zinc is not prematurely depleted. Metering, and thus controlling, the amount of oxygen that reaches the cathode, is the role of the tab 29.

The material used for tab 29 is selected in part for its permeability to transport of oxygen to the cathode. Known tab materials provide appropriate permeability to transport of oxygen to the cathode when the sum of the areas of the ports comports with the larger ports taught in the prior art. However, when the smaller port areas taught herein are used, not only is the port surface area reduced, thus favorably reducing moisture losses without unacceptably impacting limiting current, so is the surface area reduced through which oxygen permeates the tab 29, resulting in a potential for starving of the cathode for oxygen when the tab 29 is in place.

While tab 29 is desired to avoid unlimited access of oxygen to the cathode, too much limitation on the passage of oxygen is equally undesirable. The inventors herein have discovered that, when the area of the ports in combination is changed, which correspondingly changes the area which the oxygen can use for permeating the tab, accommodation of oxygen permeation must be revised to assure appropriate flow of oxygen. Where, as in this invention, the port area is to be reduced, provision should be made for flow of oxygen over and above that amount which would normally flow through the tab material through an area corresponding to the area of the ports, assuming that the same tab material is used.

Figure 9:
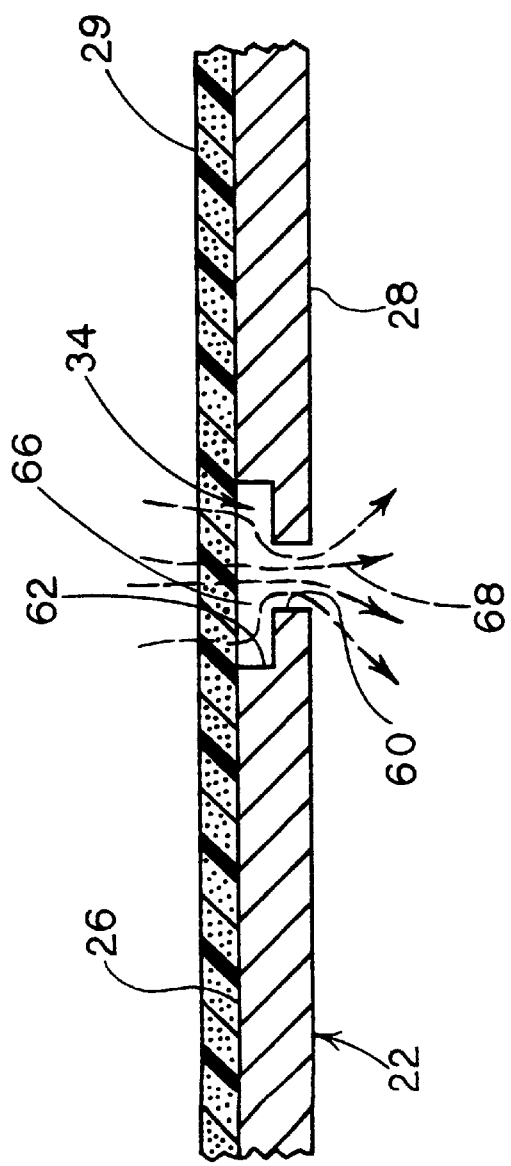
FIGS. 9–10 show an enlarged cross-section of a stepped-area port of the invention.
Figure 10:
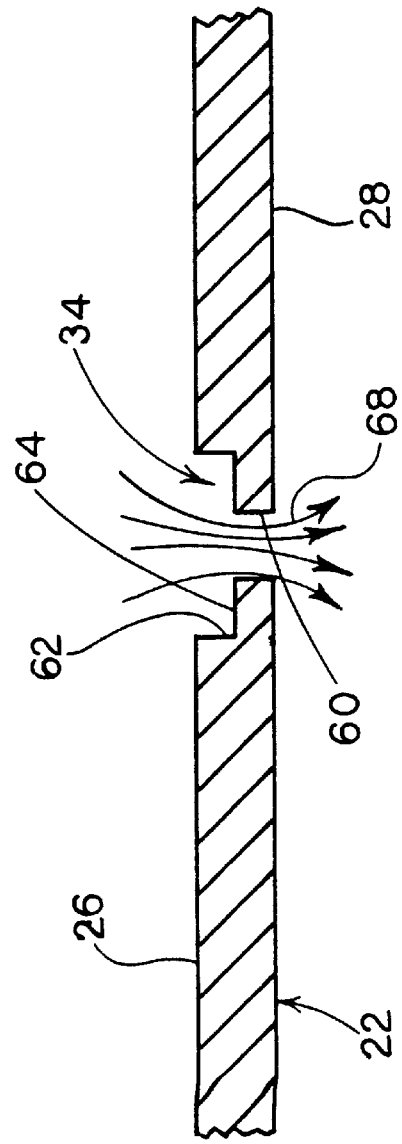

FIGS. 5, 9, and 10 illustrate modified ports 34 containing a step therein. The step includes a first perimeter wall 60 at the inner surface 28 of the bottom 22 enclosing a relatively smaller opening area, a second perimeter wall 62 at the outer surface 26 of the bottom 22 enclosing a relatively larger opening area, and a connecting wall 64 connecting the first and second perimeter walls 60 and 62 respectively. Connecting wall 64 is recessed below the outer surface 26 by at least 0.0003 inch, preferably at least about 0.0005 inch, whereby walls 62 and 64 define an interior chamber 66 for receiving air through the tab 29 and transporting the air to the smaller opening defined by the wall 60, and as indicated by the arrows 68.

Referring especially to FIGS. 9 and 10, with the tab in place as in FIG. 9, the rate of flow of air into the cell before the cell is activated is relatively low. The smaller area defined by wall 60 does not significantly restrict the flow of air at this low rate of air flow. Rather, the rate at which air/oxygen permeates through the port 34 with the tab in place (FIG. 9) is controlled by the rate at which the air/oxygen permeates the tab.

On the contrary, when the tab is removed, the higher rate of flow of air into the cell when full electrochemical potential is being used is controlled by the smaller diameter of the port as defined by wall 60. Thus, the higher permeation rate required while tab 29 is in place is facilitated by the relatively larger area encompassed by the interior chamber 66, while the limiting effect required while the cell is in use is facilitated by the small overall areas of the ports 34 as defined by the walls 60. The larger opening at interior chamber 66 has no deleterious effect on moisture vapor loss, or limiting current, when the cell is in use.

Figure 11:
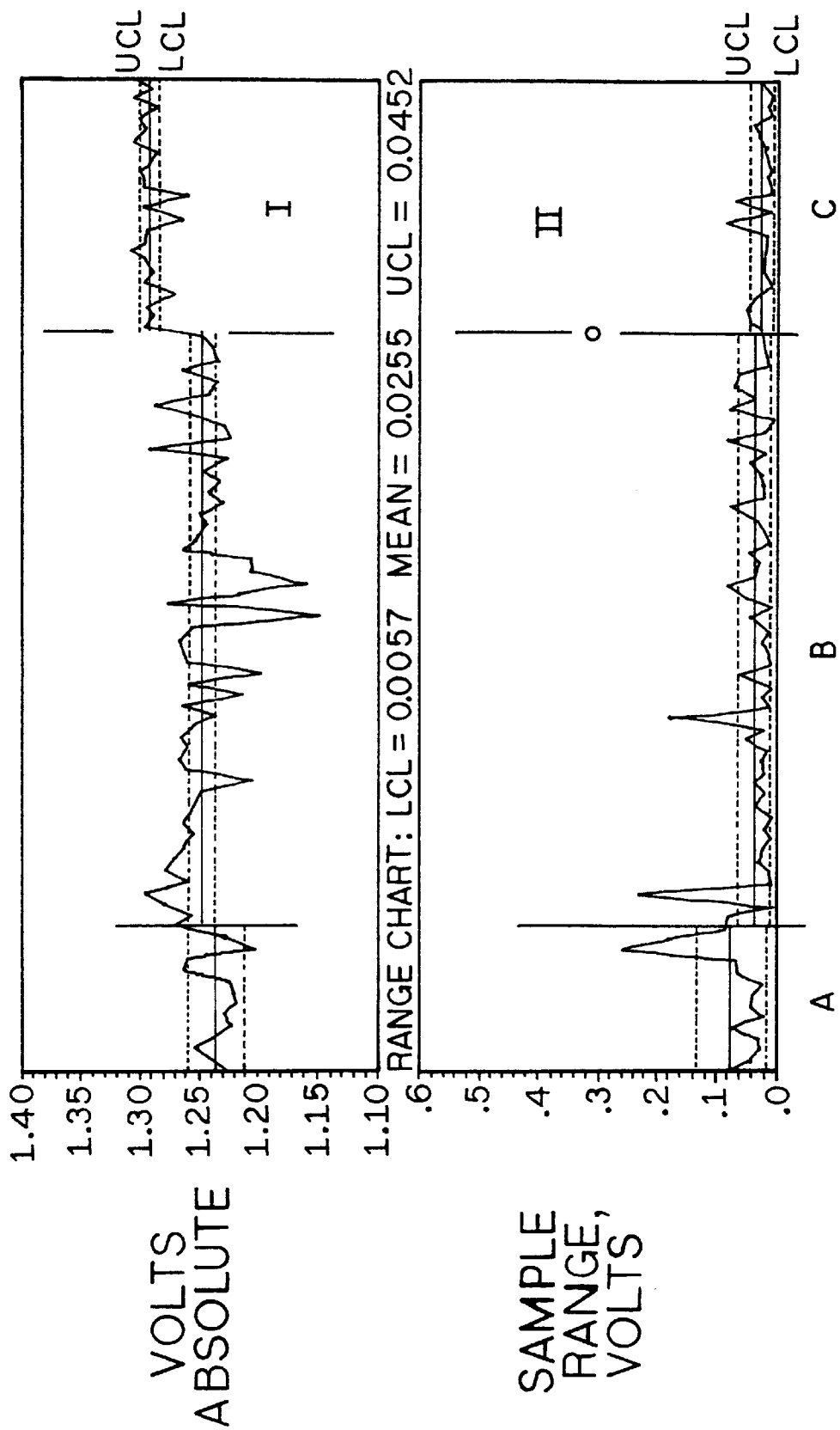
FIGS. 11–12 are graphical representations, showing cell open circuit voltage, using stepped port areas.
Figure 12:
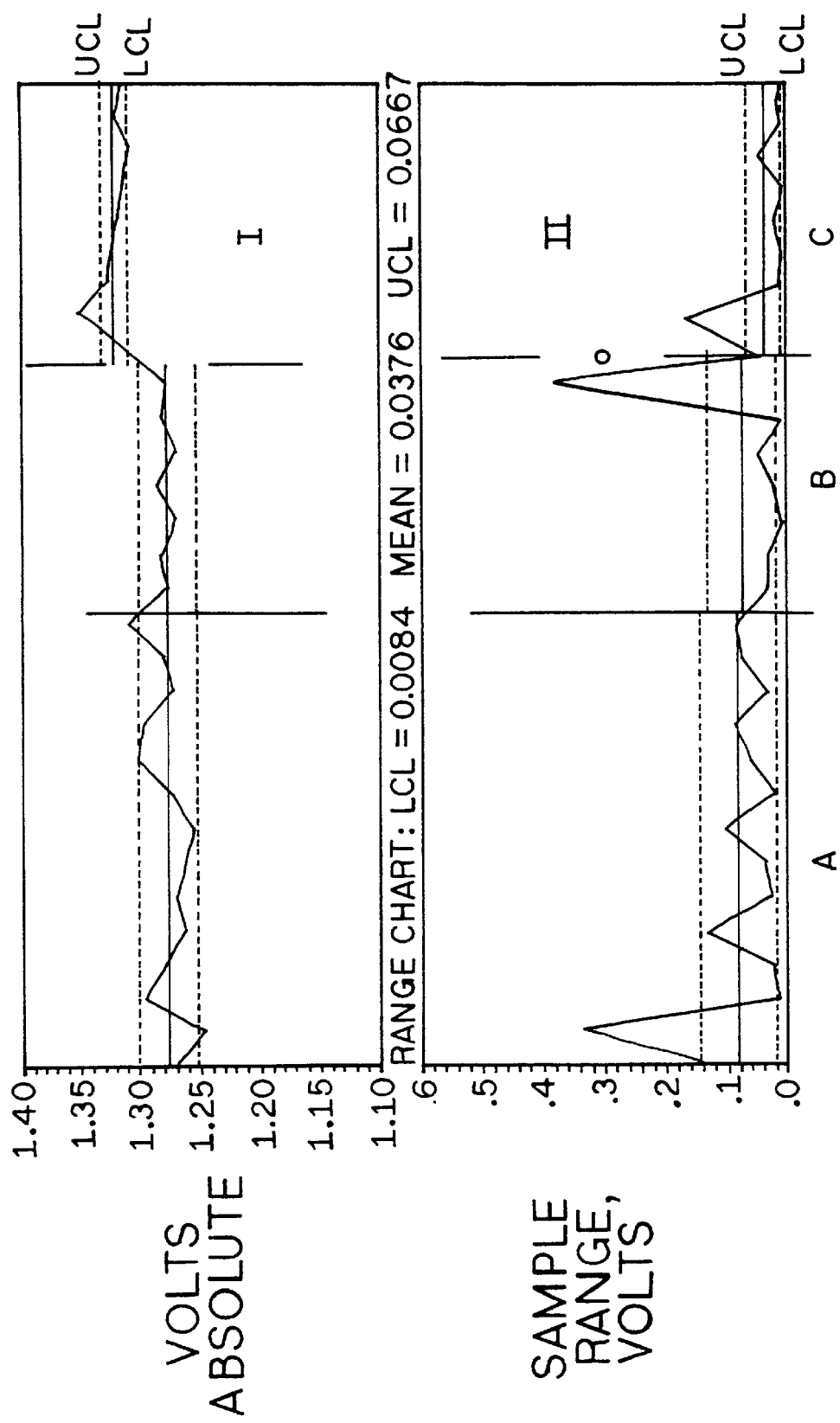

FIGS. 11 and 12 illustrate the effect of the enlarged interior chamber 66 on open cell voltage when the tab 29 is in place. Each of FIGS. 11 and 12 is divided laterally into sections "A," "B," and "C," as well as to upper and lower sections I and II respectively. In each case, Section "A" represents properties of prior art cells, using large port areas. Section "B" represents cells using the smaller port areas of this invention, but wherein the ports 34 were constant cross-section between the inner and outer surfaces 26, 28 of the bottom 22 as illustrated in FIG. 1. Section "C" represents cells of the invention using the stepped cross-section ports 34 as illustrated in FIGS. 9 and 10. The upper section "I" of each of FIGS. 11 and 12 represents open circuit voltage in "volts." The lower section "II" of each figure represents the range of the readings that went into making up the voltage readings in the immediately above voltage reading in section "I." The "X" axis in each FIGURE represents a number of readings taken from test samples of a sequence of cells being produced, each data point representing the average and range of 10 samples. Both FIGS. 9 and 10 show, by dashed lines, upper and lower control limits for the voltages reported. FIG. 11 represents the cells soon after they reached steady state open cell voltage at initial charge-up. FIG. 12 shows generally the same cells after 3 months storage.

Returning now to FIG. 11, there was minimal difference in the open cell voltage, and the upper and lower control limits, between sample sets "A" to "B." However, the open cell voltage with the stepped port cell was higher; and the range of the upper and lower control limits tightened considerably, as did the range of absolute voltages read. Similar comparisons were still evident 3 months later, as reported in FIG. 12.

As illustrated in FIGS. 11 and 12, in the invention, the tabbed voltage, namely the open circuit voltage of the cell, with the tab in place, prior to any use of the cell to power an appliance, is inherently between about 0.7 volt and about 1.4 volts. As is obvious from the above discussion of hole size and tab material permeability, the tabbed voltage can, of course, be controlled by specifying the size of the hole at the tab/cathode can interface. In that regard, a preferred tabbed voltage, as illustrated in FIGS. 11 and 12, is between about 1.1 volts and about 1.4 volts.

By thus expanding the area over which air can pass through the tab material to the port 34, the mass amount of oxygen passing through the port 34 is controlled. Given the above teaching to use interior chamber 66, any desired flow rate of oxygen into the port 34 can be obtained by adjusting the cross-sectional area defined across interior chamber 66 between sections of the wall 62, regardless of the size of the opening defined by wall 60.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An electrochemical metal-air cell, comprising:

(a) an anode;

(b) a cathode, including a cathode can, said cathode can having a bottom, said bottom having an inner surface, an outer surface, and at least two ports extending through said bottom, between said inner surface and said outer surface, each said port defining a minimum cross-sectional area thereacross, for passage of air therethrough to the interior of said cathode can; and (c) a tab sealed to said outer surface of said cathode can, covering said at least two ports, said tab having a permeability to air of about 50 cubic centimeters/100 inches square 24 hours to about 65 cubic centimeters/100 inches square 24 hours, said electrochemical cell having a limiting current, the ratio of the limiting current in milliamps to the sum of the areas of said at least two ports in millimeters squared being at least 100/1.

2. An electrochemical metal-air cell as in claim 1, said tab having a permeability to air of about 53 cubic centimeters/100 inches square 24 hours to about 60 cubic centimeters/100 inches square 24 hours.

3. An electrochemical metal-air cell as in claim 1, each of said at least two ports having an area corresponding to a diameter of no more than 0.008 inch.

4. An electrochemical metal-air cell as in claim 1, each of said at least two ports having an area corresponding to a diameter of no more than 0.005 inch.

5. An electrochemical metal-air cell, comprising:

(a) an anode;

(b) a cathode, including a cathode can, said cathode can having a bottom, an outside perimeter encompassing said bottom and defining an area of said bottom, said bottom having an inner surface, an outer surface, and at least three ports extending through said bottom, between said inner surface and said outer surface, each said port defining a minimum cross-sectional area thereacross, for passage of air therethrough to the interior of said cathode can, the average minimum cross-sectional area of said at least three ports corresponding to a diameter of no more than about 0.015 inch; and (c) a tab sealed to said outer surface of said cathode can, covering said at least three ports, said tab having a permeability to air of about 50 cubic centimeters/100 inches square 24 hours to about 65 cubic centimeters/100 inches square 24 hours.

6. An electrochemical metal-air cell as in claim 5, said tab having a permeability to air of about 53 cubic centimeters/100 inches square 24 hours to about 60 cubic centimeters/100 inches square 24 hours.

7. An electrochemical metal-air cell as in claim 5, each of said at least three ports having an area corresponding to a diameter of no more than 0.008 inch.

8. An electrochemical metal-air cell as in claim 5, each of said at least three ports having an area corresponding to a diameter of no more than 0.005 inch.

\* \* \* \* \*